US012307842B2

(12) United States Patent
Su

(10) Patent No.: US 12,307,842 B2
(45) Date of Patent: May 20, 2025

(54) METHOD FOR DEVICE CONTROL, SMART LOCK, AND NON-TRANSITORY COMPUTER-READABLE STORAGE MEDIUM

(71) Applicant: Shenzhen Kaadas Intelligent Technology Co., Ltd., Guangdong (CN)

(72) Inventor: Qiyun Su, Guangdong (CN)

(73) Assignee: SHENZHEN KAADAS INTELLIGENT TECHNOLOGY CO., LTD., Guangdong (CN)

( * ) Notice: Subject to any disclaimer, the term of this patent is extended or adjusted under 35 U.S.C. 154(b) by 339 days.

(21) Appl. No.: 18/084,748

(22) Filed: Dec. 20, 2022

(65) Prior Publication Data

US 2024/0104986 A1 Mar. 28, 2024

(30) Foreign Application Priority Data

Sep. 28, 2022 (CN) ......................... 202211189918.6

(51) Int. Cl.
*G07C 9/00* (2020.01)
*G07C 9/37* (2020.01)

(52) U.S. Cl.
CPC ..... *G07C 9/00563* (2013.01); *G07C 9/00944* (2013.01); *G07C 9/37* (2020.01); *G07C 2209/62* (2013.01)

(58) Field of Classification Search
CPC .. G07C 9/00563; G07C 9/37; G07C 9/00174; G07C 9/00944
See application file for complete search history.

(56) References Cited

U.S. PATENT DOCUMENTS

2003/0101781 A1* 6/2003 Budzynski .............. E05B 85/10 70/239
2015/0109104 A1* 4/2015 Fadell .................. G08B 27/005 340/5.7
2015/0112885 A1* 4/2015 Fadell .................. G08B 29/185 705/330
2016/0371909 A1* 12/2016 Tabata .................... E05B 81/78
(Continued)

FOREIGN PATENT DOCUMENTS

CN 106790537 A 5/2017
CN 206274654 U 6/2017
(Continued)

OTHER PUBLICATIONS

The first office action issued in corresponding CN application No. 202211189918.6 dated Dec. 18, 2024.
(Continued)

*Primary Examiner* — Yong Hang Jiang
(74) *Attorney, Agent, or Firm* — Scully, Scott, Murphy & Presser, P.C.

(57) ABSTRACT

A method for device control, a smart lock, and a non-transitory computer-readable storage medium are provided in implementations of the disclosure. The method is applied to the smart lock, and the smart lock includes at least one sensor and a handle. The method includes the following. The at least one sensor detects a target parameter of the handle. A target operation-instruction corresponding to the target parameter is determined. The target operation-instruction is executed.

18 Claims, 4 Drawing Sheets

(56) References Cited

U.S. PATENT DOCUMENTS

| | | | | |
|---|---|---|---|---|
| 2021/0009080 | A1* | 1/2021 | Hu | G06V 10/454 |
| 2021/0148144 | A1* | 5/2021 | Schatz | B60R 25/246 |
| 2021/0347216 | A1* | 11/2021 | Robertson | B60D 1/145 |
| 2022/0056734 | A1* | 2/2022 | Zhou | E05B 47/02 |
| 2022/0068060 | A1 | 3/2022 | Li et al. | |

FOREIGN PATENT DOCUMENTS

| | | | |
|---|---|---|---|
| CN | 109707232 | A | 5/2019 |
| CN | 110469199 | A | 11/2019 |
| CN | 214424278 | U | 10/2021 |
| CN | 215291914 | U | 12/2021 |
| CN | 114202833 | A | 3/2022 |
| CN | 114765609 | A | 7/2022 |

OTHER PUBLICATIONS

The second office action issued in corresponding CN application No. 202211189918.6 dated Feb. 10, 2025.

* cited by examiner

METHOD FOR DEVICE CONTROL, SMART LOCK, AND NON-TRANSITORY COMPUTER-READABLE STORAGE MEDIUM

CROSS-REFERENCE TO RELATED APPLICATIONS

This application claims priority under 35 U.S.C. § 119(a) to Chinese Patent Application No. 2022111899186, filed Sep. 28, 2022, the entire disclosure of which is incorporated herein by reference.

TECHNICAL FIELD

This disclosure relates to the field of electronic technology, and in particular, to a method for device control, a smart lock, and a non-transitory computer-readable storage medium.

BACKGROUND

With rapid development of science and technology, smart homes are inevitable results of penetration and development of computer technology, network technology, and control technology into traditional home-appliance industries. From a level of social background, with high progress of informationization in recent years, demands for home intelligentization are greatly increased because of liberalization and high hierarchization of communication, sharply rapid increase of business volumes, and increase of requirements of humans for safety, comfort, and efficiency of working environments. In addition, in science and technology, development of computer control technology and growth of electronic information and communication technology have also contributed to birth of smart homes.

Taking smart locks as examples, smart locks often complete unlocking through fingerprint modules or digital-password input regions, but handles have relatively single functions, thereby reducing intelligence of smart locks, and thus how to improve intelligence of smart locks is an urgent problem to-be-resolved.

SUMMARY

In a first aspect, a method for device control is provided in implementations of the disclosure. The method is applied to a smart lock, and the smart lock includes at least one sensor and a handle. The method includes the following. The at least one sensor detects a target parameter of the handle. A target operation-instruction corresponding to the target parameter is determined. The target operation-instruction is executed.

In a second aspect, a smart lock is provided in implementations of the disclosure. The smart lock includes at least one sensor configured to detect a target parameter of the handle, a processor, a memory, a communication interface, and one or more programs, where the one or more programs are stored in the memory and configured to be executed by the processor, and the programs include instructions used for executing determining a target operation-instruction corresponding to the target parameter and executing the target operation-instruction.

In a third aspect, a non-transitory computer-readable storage medium is provided in implementations of the disclosure. The computer-readable storage medium is configured to store computer programs used for electronic data interchange, where the computer programs enable a computer to execute part of or all of the operations described in the first aspect of implementations of the disclosure.

BRIEF DESCRIPTION OF THE DRAWINGS

To illustrate technical solutions of implementations of the disclosure more clearly, the following will give a brief introduction to accompanying drawings used for illustrating implementations. Apparently, the accompanying drawings hereinafter illustrated are some implementations of the disclosure. Based on these drawings, those of ordinary skill in the art can also obtain other drawings without creative effort.

DETAILED DESCRIPTION

In order to facilitate better understanding of solution of the disclosure by those skilled in the art, the following will illustrate clearly and completely technical solutions of implementations of the disclosure with reference to accompanying drawings of implementations of the disclosure. Apparently, implementations illustrated herein are merely some, rather than all, of the disclosure. Based on the implementations of the disclosure, all other implementations obtained by those of ordinary skill in the art without creative effort shall fall within the protection scope of the disclosure.

The terms "include", "comprise", and "have" as well as any variations used in a specification, claims, and the accompany drawings of the disclosure are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "implementation" referred to herein means that a particular feature, structure, or characteristic illustrated in conjunction with implementations may be contained in at least one implementation of the disclosure. The phrase appearing in various places in the specification does not necessarily refer to a same implementation, nor does it refer to an independent implementation that is mutually exclusive with other implementations or an alternative implementation. It is explicitly and implicitly understood by those skilled in the art that implementations illustrated herein may be combined with other implementations.

In implementations of the disclosure, a smart lock may include at least one of: a smart door-lock, a smart window-lock, etc., which is not limited herein.

In implementations of the disclosure, a terminal device may include at least one of: a smart phone, a tablet computer, a smart robot, an in-vehicle device, a wearable device, a smart vehicle, a smart home device, a computing device, other processing devices coupled with a wireless modem, various forms of user equipment (UE), mobile stations (MS), terminal devices, etc., which is not limited herein.

The smart home device may include at least one of: a smart television (TV), a smart doorbell, a smart rice cooker, a smart refrigerator, a smart washing machine, a smart treadmill, a smart air conditioner, a smart dishwasher, a smart microwave oven, a smart sofa, a smart massage chair, a smart curtain, a smart oven, a smart camera, a smart gateway, a smart router, a smart switching panel, a smart floor-sweeping robot, etc., which is not limited herein.

The following will illustrate in detail implementations of the disclosure.

Figure 1:
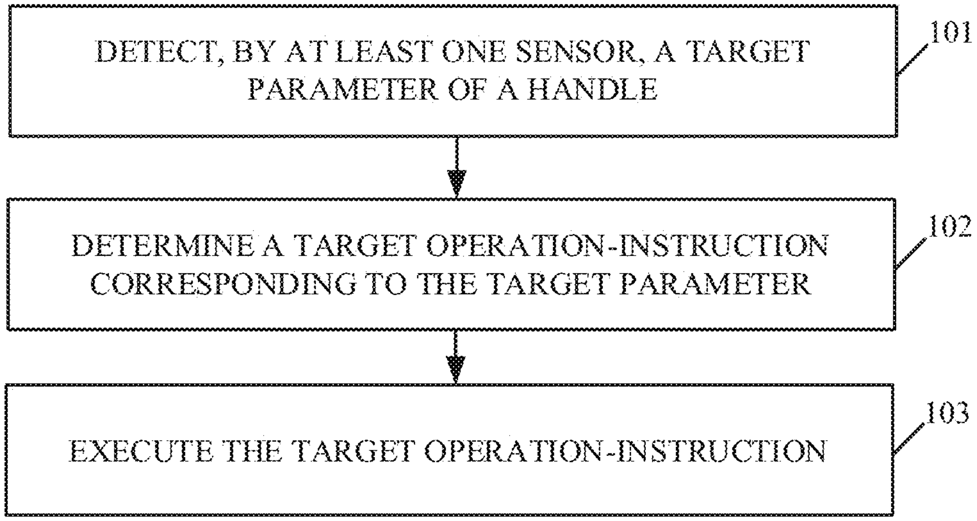
FIG. 1 is a schematic flow chart illustrating a method for device control provided in implementations of the disclosure.

Referring to FIG. 1, FIG. 1 is a schematic flow chart illustrating a method for device control provided in implementations of the disclosure. As illustrated in FIG. 1, the method is applied to a smart lock, and the smart lock includes at least one sensor and a handle. The method for device control includes the following.

101, the at least one sensor detects a target parameter of the handle.

In implementations of the disclosure, the target parameter may refer to a related parameter detected by the smart lock when the handle is operated by a user.

In specific implementations, the target parameter may include at least one of: a handle-status parameter, the number of times of a handle being lifted, a handle-lifting duration, a handle-lifting force, a handle-operation trajectory, a handle-lifting amplitude, the number of times of a handle being pressed, a handle-pressing amplitude, a handle-holding duration, a handle-holding position, a handle-holding area, etc., which is not limited herein.

In implementations of the disclosure, the handle can rotate within a angle range, where the angle range may be or defaulted by a system. A rotating operation within specified angle ranges can be regarded as a handle-lifting operation, and a rotating operation within other specified angle ranges can be regarded as a handle-pressing operation.

For example, the target parameter may be the number of times of the handle being lifted within a duration. For another example, the target parameter may be the number of times of the handle being pressed within the duration. For yet another example, the target parameter may include both the number of times of the handle being lifted within the duration and the number of times of the handle being pressed within the duration. The duration may be or defaulted by the system. Furthermore, in specific implementations, each operation can correspond to a corresponding handle-lifting amplitude or a corresponding handle-pressing amplitude regardless of the handle that is lifted or pressed each time.

For another example, the target parameter may include a target handle-operation trajectory.

In implementations of the disclosure, the smart lock may include one or more sensors, and the sensor may include at least one of: an ultrasonic sensor, a passive infrared detection (PIR) sensor, a photoelectric sensor, a gyroscope, an acceleration sensor, a barometric sensor, a geomagnetic sensor, a touch sensor, etc., which is not limited herein.

Figure 2:
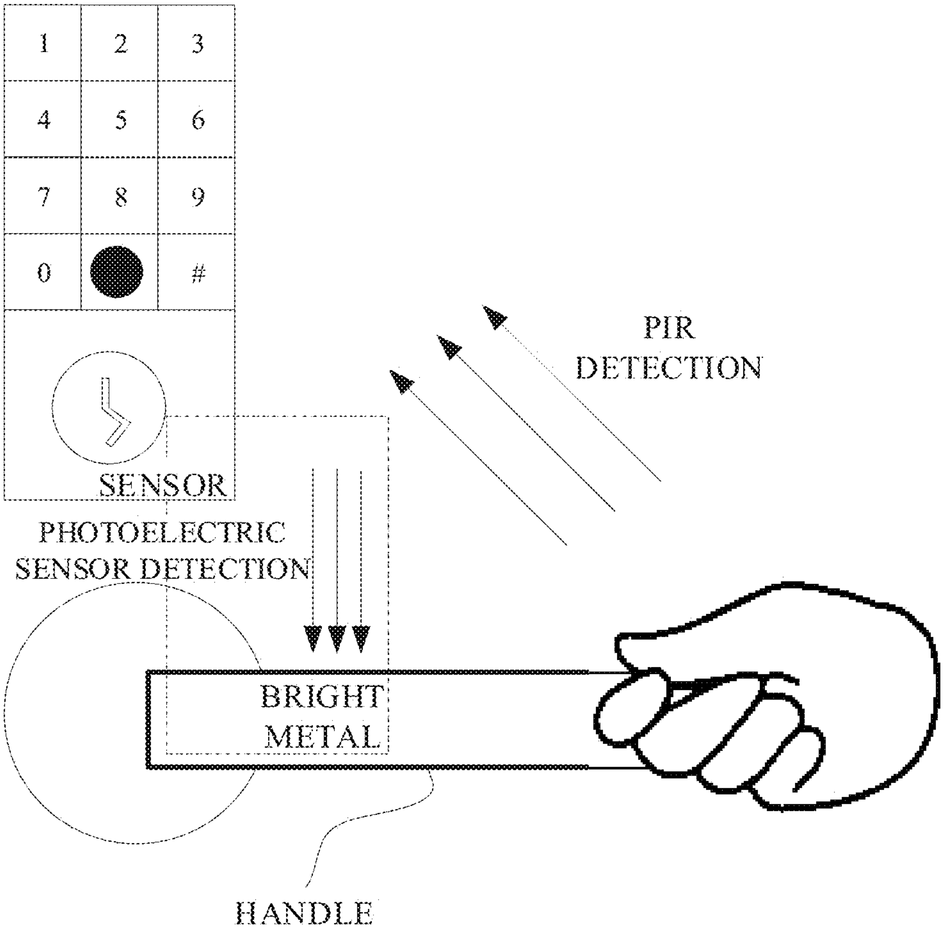
FIG. 2 is a schematic structural diagram illustrating a smart lock provided in implementations of the disclosure.
Figure 3:
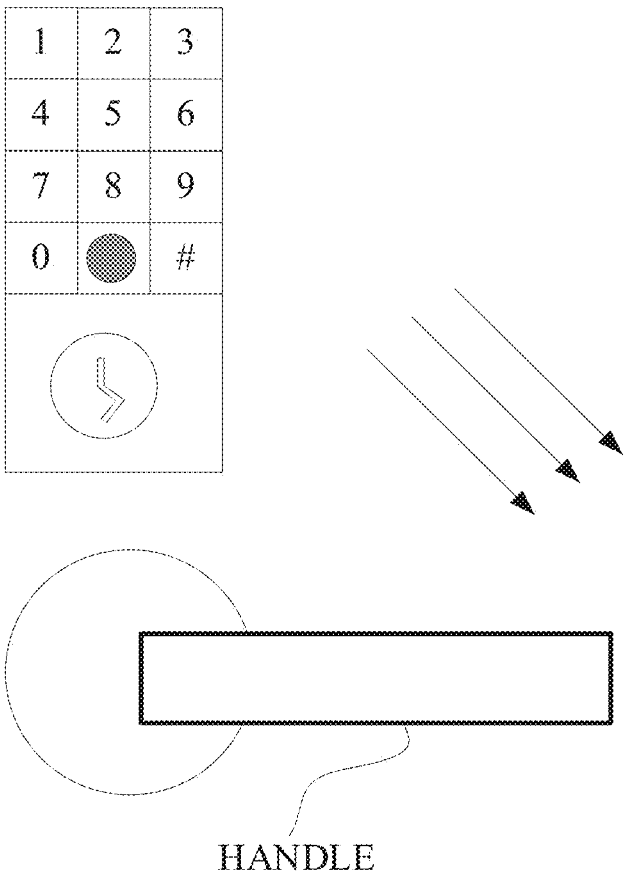
FIG. 3 is a schematic structural diagram illustrating a smart lock provided in other implementations of the disclosure.

In implementations of the disclosure, as illustrated in FIG. 2 to FIG. 3, in implementations of the disclosure, the smart lock can have a sensor close to an end of the handle, where the sensor can be used to detect a handle parameter such as a handle-status parameter, and the handle-status parameter may include, but is not limited to, two types of statuses of the handle: detecting whether the handle is pressed or lifted.

Specifically, as illustrated in a dashed box in FIG. 2, whether the handle is pressed can be determined by detecting through a reflective photoelectric sensor whether the handle is away from the photoelectric sensor, where the photoelectric sensor emits infrared lights onto the handle. The photoelectric sensor can detect reflected lights of the infrared lights when the handle is not moved. A bright metal is displaced when the handle is moved, and the photoelectric sensor can determine a status of the handle according to a detected intensity of infrared lights reflected and a detected duration from a time point when the infrared lights are emitted to the handle to a time point when the infrared lights are reflected back to the photoelectric sensor. When the handle is lifted, the intensity of the infrared lights reflected increases, and the duration for the infrared lights reflected back to the photoelectric sensor is shorter. When the handle is pressed, the intensity of the infrared lights reflected decreases, and the duration for the infrared lights reflected back to the photoelectric sensor is longer.

Furthermore, in specific implementations, for detection of whether the handle is held by a human hand, as illustrated in FIG. 3, whether the handle is held can be determined by detecting through a PIR sensor whether there exist infrared lights radiating from a human body near the handle. The PIR sensor determines that the infrared lights radiating from the human body are detected when the handle is held, thereby determining that the handle is held. The PIR sensor determines that the infrared lights radiating from the human body are not detected thereby indicating that the handle is not held by the human hand.

Figure 4:
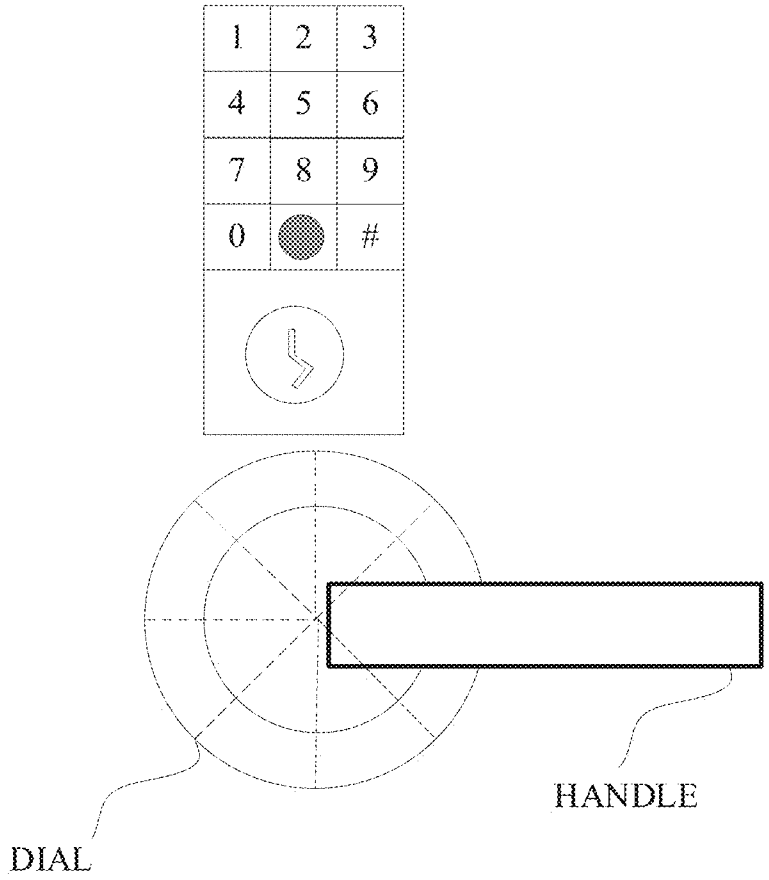
FIG. 4 is a schematic structural diagram illustrating a smart lock provided in other implementations of the disclosure.

Furthermore, in implementations of the disclosure, as illustrated in FIG. 4, the smart lock may further include a dial, where the dial is located under the handle. The dial can indicate a lifting amplitude value or a pressing amplitude value of the handle when the handle is lifted or pressed each time.

Optionally, the smart lock includes a dial, and the dial is used to indicate a lifting amplitude value or a pressing amplitude value of the handle. The at least one sensor detects the target parameter of the handle as follows. The at least one sensor and the dial obtain a handle-lifting action or a handle-pressing action of the handle within the duration in a process of the handle being lifted or pressed, where ach handle-lifting action corresponds to a lifting amplitude value of the handle, and each hand-pressing action corresponds to a pressing amplitude value. The handle-lifting action and the corresponding lifting amplitude value and/or the handle-pressing action and the corresponding pressing amplitude value are determined as the target parameter.

In implementations of the disclosure, the smart lock may include the dial, the dial may include multiple scales, and each scale corresponds to a handle-operation amplitude value (angle). The dial is used to indicate a lifting amplitude value or a pressing amplitude value of the handle, thereby assisting the user to view an amplitude of the handle being lifted or pressed. The duration may be or defaulted by the system, for example, the duration may be 5 s.

In specific implementations, the at least one sensor and the dial can obtain the handle-lifting action or the handle-pressing action of the handle within the duration in the process of the handle being lifted or pressed, where each handle-lifting action corresponds to the lifting amplitude value of the handle, and each hand-pressing action corresponds to the pressing amplitude value. The handle-lifting action and the corresponding lifting amplitude value and/or the handle-pressing action and the corresponding pressing amplitude value are determined as the target parameter. As such, a handle-operation parameter can be accurately collected.

102, a target operation-instruction corresponding to the target parameter is determined.

In specific implementations, different handle parameters may correspond to different operation instructions. The target operation-instruction may include at least one of: a door open instruction, a door close instruction, a doorbell control instruction, a video call instruction, a voice call instruction, an instruction for closing or opening a specified smart home device, a photographing instruction, etc., which is not limited herein. For example, the handle can be operated to open or close a light. For another example, the handle can be operated to unlock or lock. For yet another example, the handle can be operated to operate a device power-supply, etc.

Optionally, in the operation at 102, the target operation-instruction corresponding to the target parameter being determined can be implemented according to the following manner. The target operation-instruction corresponding to the target parameter is determined according to a mapping relationship between handle parameters and operation instructions.

In implementations of the disclosure, the mapping relationship between handle parameters and operation instructions can be pre-stored, and then the target operation-instruction corresponding to the target parameter is determined according to the mapping relationship.

Specifically, the mapping relationship between handle parameters and operation instructions can be illustrated in the following table.

| Handle parameter | Operation instruction |
|---|---|
| Handle parameter 1 | Operation instruction 1 |
| Handle parameter 2 | Operation instruction 2 |
| . . . | . . . |
| Handle parameter n | Operation instruction n |

In this way, different handle parameters may correspond to different operation parameters, thereby implementing different control functions.

Optionally, the method further includes the following.

A1, whether the target parameter meets a condition is detected.

A2, proceed to determining the target operation-instruction corresponding to the target parameter, on condition that the target parameter meets the condition.

The condition may be or defaulted by the system. For example, the condition may be lifting the handle first, or the number of times of the handle being lifted within a specified duration meeting a set number of times, which is not limited herein. The specified duration and the set number of times may be or defaulted by the system.

In specific implementations, whether the target parameter meets the condition can be detected, and proceed to determining the target operation-instruction corresponding to the target parameter on condition that the target parameter meets the condition, thereby avoiding a handle mistouch behavior, and thus improving safety.

Optionally, the at least one sensor includes a touch sensor, and the target parameter includes a target touch-parameter detected by the touch sensor. In the operation at A1, whether the target parameter meets the condition is detected as follows.

A11, the target touch-parameter and a touch-parameter are compared.

A12, it is determined that the target parameter meets the condition, on condition that the target touch-parameter matches the touch-parameter.

A13, it is determined that the target parameter fails to meet the condition, on condition that the target touch-parameter fails to match the touch-parameter.

The touch-parameter may be or defaulted by the system. The touch-parameter may include at least one of: a touch force, a touch duration, the number of times of touch/a touch frequency, a touch position, a touch area, a touch temperature, a touch humidity, etc., which is not limited herein.

In implementations of the disclosure, the touch sensor can be disposed on the handle, a touch parameter can be detected by the touch sensor when the handle is touched by the user, where the touch parameter may include at least one of: a touch force, a touch duration, the number of times of touch/a touch frequency, a touch position, a touch area, a touch temperature, a touch humidity, etc., which is not limited herein.

In specific implementations, the target touch-parameter can also be obtained first by the touch sensor, the target touch-parameter and the touch-parameter are compared, and proceed to the operation at 101 on condition that the target touch-parameter matches the touch-parameter, otherwise, subsequent operations can be skipped, thereby avoiding a touch by mistake.

Furthermore, the smart lock further includes a camera, and the method further includes the following.

A3, a target image is obtained by controlling the camera to photograph an operating object of the handle, on condition that the target parameter fails to meet the condition.

A4, the target image is stored into a storage region.

The storage region may be or defaulted by the system. The storage region may be a memory of the smart lock, a cloud, or a storage region of an edge server.

In implementations of the disclosure, the smart lock further includes the camera. In specific implementations, it can be determined that the handle is illegally operated by a stranger when the target parameter fails to meet the condition, then the target image can be obtained by controlling the camera to photograph the operation object of the handle, and the target image is stored in the storage region, so that the image of the operation object can be recorded when the handle is improperly operated, thereby improving safety.

In specific implementations, the target image is obtained by controlling the camera to photograph the operating object of the handle, so that a target environmental-parameter can be obtained, and then a target photographing-parameter corresponding to the target environmental-parameter is determined. For example, a mapping relationship between environmental parameters and photographing parameters can be pre-stored, so that the target photographing-parameter corresponding to the target environmental-parameter can be determined according to the mapping relationship, and thus the target image is obtained by focusing on the operation object and photographing the operation object of the handle according to the target photographing-parameter, thereby ensuring photographing effect and further ensuring safety. The target environmental-parameter may include at least one of: environmental light-brightness, an environmental temperature, a weather, an environmental background, etc., which is not limited herein. The target photographing-parameter may include at least one of: a sensitivity, an exposure duration, a white balance parameter, etc., which is not limited herein.

103, the target operation-instruction is executed.

In implementations of the disclosure, a corresponding target operation-instruction can be executed when a corresponding operation-instruction is generated according to a handle parameter, thereby improving safety of the smart lock. The smart lock can implement an unlock or lock function through only the handle, which can reduce cost of the smart lock and can also improve intelligence of the smart lock.

In implementations of the disclosure, a behavior of a user who wants to open or close a door can be recognized, and then the door or a window can be open or closed for the user, so that the user has a better user experience. For example, a gyroscope can be added on the smart lock, where the gyroscope can detect an open state and a closed state of the door, and the door and the window can be automatically locked when the door and the window are closed by a human.

For example, take the lock or unlock function as an example. For example, the handle is operated six times within a duration, six times of operations include two times of handle-lifting operations and four times of handle-pressing operations, where a specific operation order may be the following. A first handle operation is a handle-lifting operation, and a lifting amplitude value is a first amplitude value; a second handle operation is a handle-pressing operation, and a pressing amplitude value is a second amplitude value; a third handle operation is a handle-lifting operation, and a lifting amplitude value is a third amplitude value; a fourth handle operation is a handle-pressing operation, and a pressing amplitude value is a fourth amplitude value; a fifth handle operation is a handle-pressing operation, and a pressing amplitude value is a fifth amplitude value; and a sixth handle operation is a handle-pressing operation, and a pressing amplitude value is a sixth amplitude value. However, six times of handle operations corresponding to correct unlocking are the following. A first handle operation is a handle-lifting operation, and a lifting amplitude value is a first amplitude value; a second handle operation is a handle-pressing operation, and a pressing amplitude value is a second amplitude value; a third handle operation is a handle-lifting operation, and a lifting amplitude value is a third amplitude value; a fourth handle operation is a handle-pressing operation, and a pressing amplitude value is a fourth amplitude value; a fifth handle operation is a handle-pressing operation, and a pressing amplitude value is a fifth amplitude value; and a sixth handle operation is a handle-pressing operation, and a pressing amplitude value is a sixth amplitude value. A lock or unlock operation can be achieved through handle operations only if three conditions are satisfied, where the three conditions are that the order of the six times of handle operations and the order of the six times of handle operations are consistent, actions of the six times of handle operations and actions of the six times of handle operations are consistent, and amplitude errors between the six times of handle operations and the six times of handle operations are in a range, where the range may be or defaulted by the system, e.g., an absolute value of a difference between the first amplitude value and the first amplitude value is in the range. In specific implementations, unlocking can be achieved through handle operations when a door sometimes is difficult to be opened with a fingerprint.

Furthermore, in implementations of the disclosure, unlocking can be performed through not only conventional means (e.g., the above six times of handle operations) but also an alternative unlock manner, where the alternative unlock manner may correspond to another handle parameter. For example, a handle-parameter is detected, where the handle-parameter is a handle parameter corresponding to the alternative unlock manner, so that unlocking can be achieved, and remote alarming can also be triggered. For example, an environmental image or an environmental video can be obtained while unlocking, and then the environmental image or the environmental video is transmitted to a remote alarm system. For example, a user who sometimes is tracked or coerced can use the manner to alarm inadvertently, thereby ensuring user security and further achieving unlocking.

In specific implementations, an indication can be performed by voice or an indicator when a handle-lifting operation or a handle-pressing operation is completed each time, and a scale value can also indicate an amplitude value of each handle-lifting operation or each handle-pressing operation.

In implementations of the disclosure, considering that most of door and window sensors on a market each are composed of a "transmitter" and a "receiver", the transmitter is generally a magnet or an infrared light, and the receiver determines whether the transmitter is nearby by receiving two types of signals transmitted by the magnet or the infrared light. It is determined that a door or a window is closed if the receiver determines that the transmitter is nearby, or it is determined that the transmitter is not nearby and the door or the window is open if the receiver determines that no signal transmitted is detected. Therefore, the door or the window sensors can detect only an open-and-closed state of the door or the window but cannot know whether the user wants to open or close the door. These sensors each are an independent device and cannot link a handle of a door or a handle of a window, while other door locks on the market capable of detecting a status of a handle are equipped with the handle customized by a manufacturer and cannot be adapted to an original door handle of a home of the user. In the disclosure, a solution for detecting opening or closing of a door or a window is provided, and the solution can be adapted to any handle. In implementations of the disclosure, the smart lock can be automatically locked or unlocked according to an action of a handle, and can also report a status of the handle or link other devices. In a specific design, an original handle can be unnecessarily changed because the sensor is placed on a smart lock. It is also possible to place an acceleration sensor, an air pressure sensor, or a geomagnetic sensor on the handle, where these sensors determine a status of the handle (lifted/pressed/static) and then transmit the status of the handle to a smart switching device through a wireless technology solution (infrared, Bluetooth, zigbee, wireless fidelity (wifi), 433, etc.).

As can be seen, the method for device control described in implementations of the disclosure is applied to the smart lock, and the smart lock includes the at least one sensor and the handle. The at least one sensor detects the target parameter of the handle. The target operation-instruction corresponding to the target parameter is determined. The target operation-instruction is executed. A related parameter of a handle operation can be detected. A handle parameter reflects an intention of the user. Furthermore, an instruction corresponding to the handle parameter can be generated, and the instruction is executed, thereby achieving the intention of the user, and thus improving intelligence of the smart lock.

Figure 5:
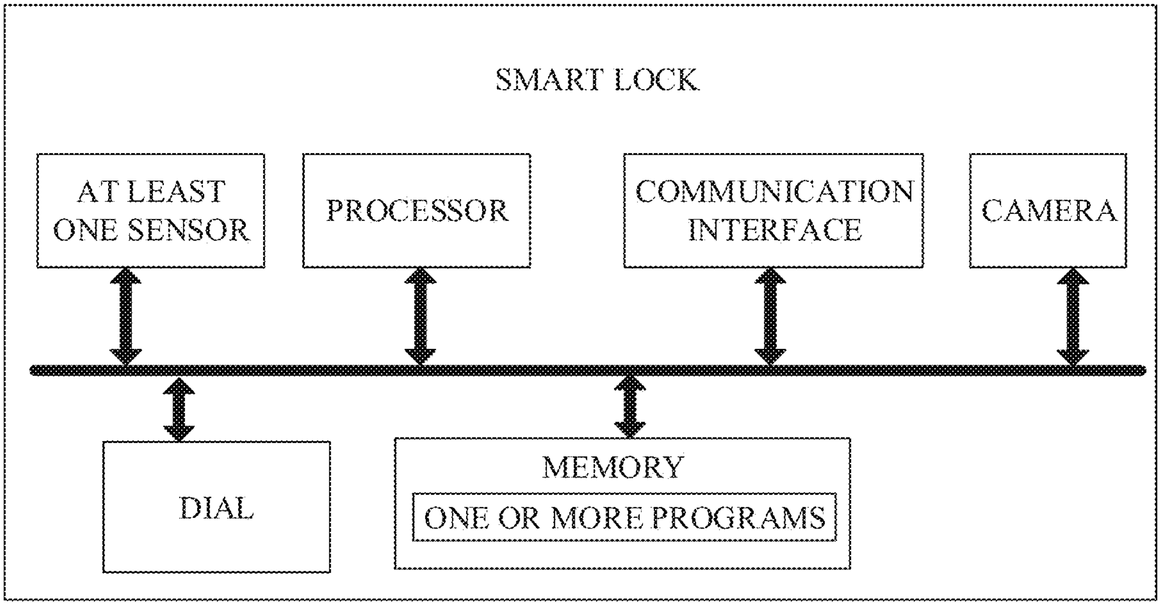
FIG. 5 is a schematic structural diagram illustrating a smart lock provided in other implementations of the disclosure.

Same as the above implementations, referring to FIG. 5, FIG. 5 is a schematic structural diagram illustrating a smart lock provided in implementations of the disclosure. As illustrated in FIG. 5, the smart lock includes at least one sensor configured to detect a target parameter of a handle, a processor, a memory, a communication interface, and one or more programs, where the one or more programs are stored in the memory and configured to be executed by the processor. In implementations of the disclosure, the programs include instructions used for executing the following. A target operation-instruction corresponding to the target parameter is determined. The target operation-instruction is executed.

Optionally, in determining the target operation-instruction corresponding to the target parameter, the programs include instructions used to execute the following. The target operation-instruction corresponding to the target parameter is determined according to a mapping relationship between handle parameters and operation instructions.

Optionally, the smart lock includes a dial, and the dial is used to indicate a lifting amplitude value or a pressing amplitude value of the handle. In detecting the target parameter of the handle by the at least one sensor, the programs include instructions used to execute the following. A handle-lifting action or a handle-pressing action of the handle is obtained via the at least one sensor and the dial within a duration in a process of the handle being lifted or pressed, where each handle-lifting action corresponds to a lifting amplitude value of the handle, and each hand-pressing action corresponds to a pressing amplitude value. The handle-lifting action and the corresponding lifting amplitude value and/or the handle-pressing action and the corresponding pressing amplitude value are determined as the target parameter.

Optionally, the programs further include instructions used to execute the following. Whether the target parameter meets a condition is detected. Proceed to determining the target operation-instruction corresponding to the target parameter, on condition that the target parameter meets the condition.

Optionally, the at least one sensor includes a touch sensor, and the target parameter includes a target touch-parameter detected by the touch sensor. In detecting whether the target parameter meets the condition, the programs include instructions used to execute the following. The target touch-parameter and a touch-parameter are compared. It is determined that the target parameter meets the condition, on condition that the target touch-parameter matches the touch-parameter. It is determined that the target parameter fails to meet the condition, on condition that the target touch-parameter fails to match the touch-parameter.

Optionally, the smart lock further includes a camera, and the programs further include instructions used to execute the following. A target image is obtained by controlling the camera to photograph an operating object of the handle, on condition that the target parameter fails to meet the condition. The target image is stored into a storage region.

As can be seen, the smart lock described in implementations of the disclosure includes the at least one sensor and the handle. The at least one sensor detects the target parameter of the handle. The target operation-instruction corresponding to the target parameter is determined. The target operation-instruction is executed. A related parameter of a handle operation can be detected. A handle parameter reflects an intention of a user. Furthermore, an instruction corresponding to the handle parameter can be generated, and the instruction is executed, thereby achieving the intention of the user, and thus improving intelligence of the smart lock.

Figure 6:
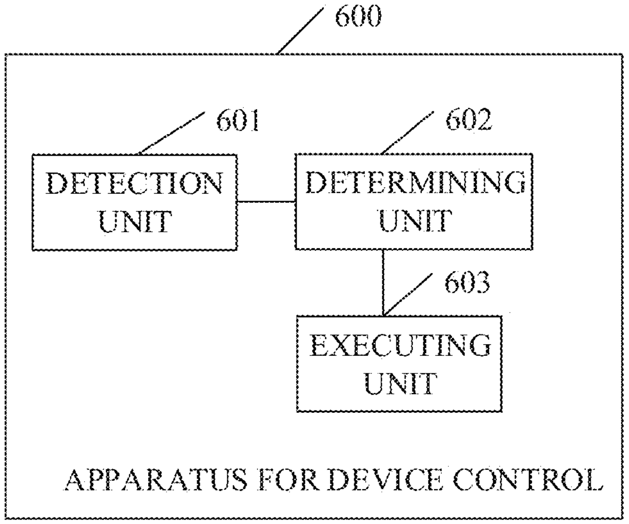
FIG. 6 is a block diagram illustrating functional units of an apparatus for device control provided in implementations of the disclosure.

FIG. 6 is a block diagram illustrating functional units of an apparatus for device control 600 revolved in implementations of the disclosure. The apparatus for device control 600 is applied to a smart lock, and the smart lock includes at least one sensor and a handle. The apparatus 600 includes a detection unit 601, a determining unit 602, and an executing unit 603. The detection unit 601 is configured to detect a target parameter of the handle via the at least one sensor. The determining unit 602 is configured to determine a target operation-instruction corresponding to the target parameter. The executing unit 603 is configured to execute the target operation-instruction.

Optionally, the determining unit 602 configured to determine the target operation-instruction corresponding to the target parameter is specifically configured to determine the target operation-instruction corresponding to the target parameter according to a mapping relationship between handle parameters and operation instructions.

Optionally, the smart lock includes a dial, and the dial is used to indicate a lifting amplitude value or a pressing amplitude value of the handle. The detection unit 601 configured to detect the target parameter of the handle via the at least one sensor is specifically configured to perform the following. A handle-lifting action or a handle-pressing action of the handle is obtained via the at least one sensor and the dial within a duration in a process of the handle being lifted or pressed, where each handle-lifting action corresponds to a lifting amplitude value of the handle, and each hand-pressing action corresponds to a pressing amplitude value. The handle-lifting action and the corresponding lifting amplitude value and/or the handle-pressing action and the corresponding pressing amplitude value are determined as the target parameter.

Optionally, the apparatus 600 is further specifically configured to perform the following. Whether the target parameter meets a condition is detected. Proceed to determining the target operation-instruction corresponding to the target parameter, on condition that the target parameter meets the condition.

Optionally, the at least one sensor includes a touch sensor, and the target parameter includes a target touch-parameter detected by the touch sensor. The apparatus 600 configured to detect whether the target parameter meets the condition is specifically configured to perform the following. The target touch-parameter and a touch-parameter are compared. It is determined that the target parameter meets the condition, on condition that the target touch-parameter matches the touch-parameter. It is determined that the target parameter fails to meet the condition, on condition that the target touch-parameter fails to match the touch-parameter.

Optionally, the smart lock further includes a camera, and the apparatus 600 is further specifically configured to perform the following. A target image is obtained by controlling the camera to photograph an operating object of the handle, on condition that the target parameter fails to meet the condition. The target image is stored into a storage region.

As can be seen, the apparatus for device control described in implementations of the disclosure is applied to the smart lock, and the smart lock includes the at least one sensor and the handle. The at least one sensor detects the target parameter of the handle. The target operation-instruction corresponding to the target parameter is determined. The target operation-instruction is executed. A related parameter of a handle operation can be detected. A handle parameter reflects an intention of a user. Furthermore, an instruction corresponding to the handle parameter can be generated, and the instruction is executed, thereby achieving the intention of the user, and thus improving intelligence of the smart lock.

It can be understood that, functions of various program modules of the apparatus for device control in the implementation can be specifically achieved according to the method in the foregoing method implementations, and specific implementation processes can refer to the related illustration of the foregoing method implementations, which are not repeated herein.

A non-transitory computer-readable storage medium is further provided in implementations of the disclosure. The computer storage medium is configured to store computer programs used for electronic data interchange, where the computer programs enable a computer to execute part of or all of the operations of any method described in the foregoing method implementations. The computer includes a smart lock.

A computer program product is further provided in implementations of the disclosure. The computer program product includes a non-transitory computer-readable storage medium that stores computer programs. The computer programs are operable with a computer to execute part of or all of the operations of any method described in the foregoing method implementations. The computer program product may be a software installation package, and the computer includes a smart lock.

It is to be noted that for the sake of simplicity, the foregoing method implementations are described as a series of action combinations. However, it will be appreciated by those skilled in the art that the disclosure is not limited by the sequence of actions described. According to the disclosure, some operations may be performed in other orders or simultaneously. Besides, it will be appreciated by those skilled in the art that the implementations described in the specification are preferred implementations, and the actions and modules involved are not necessarily essential to the disclosure.

In the foregoing implementations, the illustration of each implementation has its own emphasis. For the parts not described in detail in one implementation, reference may be made to related illustrations in other implementations.

In several implementations provided in the disclosure, it will be appreciated that the apparatuses disclosed may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, apparatuses, or units, and may be electrical, or otherwise.

Units illustrated as separated parts may or may not be physically separated. Components or parts displayed as units may or may not be physical units, and may reside at one location or may be distributed to multiple network units. Part of or all of the units may be selectively adopted according to practical needs to achieve desired objectives of the solutions of implementations.

In addition, various functional units described in various implementations of the disclosure may be integrated into one processing unit or may be presented as a number of physically separated units, and two or more units may be integrated into one unit. The integrated unit may be implemented by a form of hardware or a software program module.

If the integrated units are implemented as software program modules and sold or used as standalone products, they may be stored in a computer readable memory. According to such an understanding, the essential technical solution, or the portion that contributes to the related art, or all or part of the technical solution of the disclosure may be expressed as software products. The computer software products can be stored in a memory and may include multiple instructions that, when executed, can cause a computing device (e.g., a personal computer, a server, a network device, etc.) to execute all or part of operations of the method described in various implementations of the disclosure. The above memory may include various kinds of media that can store program codes, such as a universal serial bus (USB) flash disk, an ROM, an RAM, a mobile hard disc, a magnetic disk, or an optical disk.

It will be understood by those of ordinary skill in the art that all or part of the operations of the method in the implementations described above may be accomplished by means of a program to instruct associated hardware, and the program may be stored in a computer-readable memory, which may include a flash disk, an ROM, an RAM, a magnetic disk, or an optical disk.

The above implementations in the disclosure are introduced in detail. Principles and implementation manners of the disclosure are elaborated with specific implementations herein. The illustration of implementations above is only used to help understanding of method and core ideas of the disclosure. At the same time, for those of ordinary skill in the art, according to ideas of the disclosure, there will be changes in the specific implementation manners and application scope. In summary, contents of this specification should not be understood as limitation on the disclosure.

What is claimed is:

1. A method for device control, performed by a smart lock, the smart lock comprising at least one sensor and a handle, and the method comprising:

detecting, by the at least one sensor, a target parameter of the handle;

determining a target operation-instruction corresponding to the target parameter; and executing the target operation-instruction;

wherein the smart lock comprises a dial, and the dial is used to indicate a lifting amplitude value or a pressing amplitude value of the handle; and detecting, by the at least one sensor, the target parameter of the handle comprises:

obtaining, by the at least one sensor and the dial, a handle-lifting action or a handle-pressing action of the handle within a duration in a process of the handle being lifted or pressed, wherein each handle-lifting action corresponds to a lifting amplitude value of the handle, and each hand-pressing action corresponds to a pressing amplitude value; and determining the handle-lifting action and the corresponding lifting amplitude value and/or the handle-pressing action and the corresponding pressing amplitude value as the target parameter.

2. The method for device control of claim 1, wherein determining the target operation-instruction corresponding to the target parameter comprises:

determining the target operation-instruction corresponding to the target parameter according to a mapping relationship between handle parameters and operation instructions.

3. The method for device control of claim 1, further comprising:

detecting whether the target parameter meets a condition; and proceeding to determining the target operation-instruction corresponding to the target parameter, on condition that the target parameter meets the condition.

4. The method for device control of claim 3, wherein the at least one sensor comprises a touch sensor, and the target parameter comprises a target touch-parameter detected by the touch sensor; and detecting whether the target parameter meets the condition comprises:

comparing the target touch-parameter and a touch-parameter; and determining that the target parameter meets the condition, on condition that the target touch-parameter matches the touch-parameter; or determining that the target parameter fails to meet the condition, on condition that the target touch-parameter fails to match the touch-parameter.

5. The method for device control of claim 4, wherein the smart lock further comprises a camera, and the method further comprises:

obtaining a target image by controlling the camera to photograph an operating object of the handle, on condition that the target parameter fails to meet the condition; and storing the target image into a storage region.

6. The method for device control of claim 5, wherein obtaining the target image by controlling the camera to photograph the operating object of the handle comprises:

obtaining a target environmental-parameter;

determining a target photographing-parameter corresponding to the target environmental-parameter; and obtaining the target image by focusing on the operation object of the handle and photographing the operation object of the handle according to the target photographing-parameter.

7. The method for device control of claim 6, wherein determining the target photographing-parameter corresponding to the target environmental-parameter comprises:

determining the target photographing-parameter corresponding to the target environmental-parameter according to a mapping relationship between environmental parameters and photographing parameters.

8. The method for device control of claim 1, wherein the target parameter comprises at least one of: a handle-status parameter, the number of times of a handle being lifted, a handle-lifting duration, a handle-lifting force, a handle-operation trajectory, a handle-lifting amplitude, the number of times of a handle being pressed, a handle-pressing amplitude, a handle-holding duration, a handle-holding position, or a handle-holding area.

9. The method for device control of claim 1, wherein the target operation-instruction comprises at least one of: a door open instruction, a door close instruction, a doorbell control instruction, a video call instruction, a voice call instruction, an instruction for closing or opening a specified smart home device, or a photographing instruction.

10. A smart lock, comprising:

at least one sensor configured to detect a target parameter of the handle;

a processor; and a memory configured to store one or more programs that are configured to be executed by the processor, and the programs comprise instructions used for executing:

determining a target operation-instruction corresponding to the target parameter; and executing the target operation-instruction;

wherein the smart lock comprises a dial, and the dial is used to indicate a lifting amplitude value or a pressing amplitude value of the handle; and in terms of detecting the target parameter of the handle, the programs comprise instructions used for executing:

obtaining a handle-lifting action or a handle-pressing action of the handle within a duration in a process of the handle being lifted or pressed, wherein each handle-lifting action corresponds to a lifting amplitude value of the handle, and each hand-pressing action corresponds to a pressing amplitude value; and determining the handle-lifting action and the corresponding lifting amplitude value and/or the handle-pressing action and the corresponding pressing amplitude value as the target parameter.

11. The smart lock of claim 10, wherein in terms of determining the target operation-instruction corresponding to the target parameter, the programs comprise instructions used for executing:

determining the target operation-instruction corresponding to the target parameter according to a mapping relationship between handle parameters and operation instructions.

12. The smart lock of claim 10, wherein the programs comprise instructions used for executing:

detecting whether the target parameter meets a condition; and proceeding to determining the target operation-instruction corresponding to the target parameter, on condition that the target parameter meets the condition.

13. The smart lock of claim 12, wherein the at least one sensor comprises a touch sensor, and the target parameter comprises a target touch-parameter detected by the touch sensor; and in terms of detecting whether the target parameter meets the condition, the programs comprise instructions used for executing:

comparing the target touch-parameter and a touch-parameter; and determining that the target parameter meets the condition, on condition that the target touch-parameter matches the touch-parameter; or determining that the target parameter fails to meet the condition, on condition that the target touch-parameter fails to match the touch-parameter.

14. The smart lock of claim 13, wherein the smart lock further comprises a camera, and the programs further comprise instructions used for executing:

obtaining a target image by controlling the camera to photograph an operating object of the handle, on condition that the target parameter fails to meet the condition; and storing the target image into a storage region.

15. The smart lock of claim 14, wherein in terms of obtaining the target image by controlling the camera to photograph the operating object of the handle, the programs comprise instructions used for executing:

obtaining a target environmental-parameter;

determining a target photographing-parameter corresponding to the target environmental-parameter; and obtaining the target image by focusing on the operation object and photographing the operation object of the handle according to the target photographing-parameter.

16. The smart lock of claim 15, wherein in terms of determining the target photographing-parameter corresponding to the target environmental-parameter, the programs comprise instructions used for executing:

determining the target photographing-parameter corresponding to the target environmental-parameter according to a mapping relationship between environmental parameters and photographing parameters.

17. A non-transitory computer-readable storage medium configured to store computer programs used for electronic data interchange, wherein the computer programs enable a computer to execute:

detecting a target parameter of a handle;

determining a target operation-instruction corresponding to the target parameter; and executing the target operation-instruction;

in terms of detecting the target parameter of the handle, the computer programs further enable the computer to execute:

obtaining a handle-lifting action or a handle-pressing action of the handle within a duration in a process of the handle being lifted or pressed, wherein each handle-lifting action corresponds to a lifting amplitude value of the handle, and each hand-pressing action corresponds to a pressing amplitude value; and determining the handle-lifting action and the corresponding lifting amplitude value and/or the handle-pressing action and the corresponding pressing amplitude value as the target parameter.

18. The non-transitory computer-readable storage medium of claim 17, wherein in terms of determining the target operation-instruction corresponding to the target parameter, the computer programs enable the computer to execute:

determining the target operation-instruction corresponding to the target parameter according to a mapping relationship between handle parameters and operation instructions.

* * * * *